(12) United States Patent
Carnation

(10) Patent No.: US 7,448,537 B2
(45) Date of Patent: Nov. 11, 2008

(54) BANK CARD WITH SWEEPSTAKES FEATURE

(76) Inventor: Richard E. Carnation, 7633 Lakewood Dr., Suite 205, Windsor, CA (US) 95492

( * ) Notice: Subject to any disclaimer, the term of this patent is extended or adjusted under 35 U.S.C. 154(b) by 286 days.

(21) Appl. No.: 11/204,851

(22) Filed: Aug. 16, 2005

(65) Prior Publication Data
US 2006/0213977 A1    Sep. 28, 2006

Related U.S. Application Data

(63) Continuation-in-part of application No. 11/089,693, filed on Mar. 24, 2005, now Pat. No. 7,168,616.

(51) Int. Cl.
*G06K 5/00* (2006.01)

(52) U.S. Cl. .......................... 235/380; 705/39; 705/41; 902/25

(58) Field of Classification Search ................ 235/380; 705/39, 41
See application file for complete search history.

(56) References Cited

U.S. PATENT DOCUMENTS

| | | | |
|---|---|---|---|
| 4,953,895 A * | 9/1990 | Goussios | 283/102 |
| 5,774,884 A | 6/1998 | Watanabke et al. | |
| 6,028,920 A * | 2/2000 | Carson | 379/114.2 |
| 6,656,050 B2 * | 12/2003 | Busch et al. | 463/42 |
| 7,052,393 B1 * | 5/2006 | Schoen | 463/17 |
| 7,316,614 B2 * | 1/2008 | Dietz et al. | 463/25 |
| 2001/0050311 A1 | 12/2001 | Avelino | |
| 2002/0111918 A1 | 8/2002 | Hoshino et al. | |
| 2003/0057274 A1 | 3/2003 | Dawson | |
| 2003/0233278 A1 | 12/2003 | Marshall | |
| 2004/0010447 A1 * | 1/2004 | Asayama | 705/14 |
| 2004/0143502 A1 * | 7/2004 | McClung, III | 705/14 |
| 2004/0158489 A1 * | 8/2004 | Rogers | 705/14 |
| 2004/0169088 A1 | 9/2004 | Nelms et al. | |
| 2005/0021457 A1 | 1/2005 | Johnson | |

FOREIGN PATENT DOCUMENTS

| | | | |
|---|---|---|---|
| JP | 08249396 A | | 9/1998 |
| JP | 2002373303 A | | 12/2002 |
| JP | 2004013601 A | * | 1/2004 |
| JP | 20040013601 A | | 1/2004 |

* cited by examiner

*Primary Examiner*—Uyen-Chau N Le
(74) *Attorney, Agent, or Firm*—Dergosits & Noah LLP

(57) ABSTRACT

A method of purchasing goods or services with use of a bank card. The bank card is issued to consumers as a means of identifying the consumers and for extending credit to the consumers for the purchase of goods or services. A database is established of those consumers which hold the bank cards and at least one consumer is chosen from the database as the recipient of a prize.

8 Claims, 2 Drawing Sheets

BANK CARD WITH SWEEPSTAKES FEATURE

RELATED APPLICATIONS

The present application is a continuation in part of U.S. application Ser. No. 11/089,693 filed on Mar. 24, 2005.

FIELD OF THE INVENTION

The present invention relates generally to financial network systems, and more specifically to credit cards than include a sweepstakes feature.

BACKGROUND OF THE INVENTION

For many years, banks and other financial institutions have extended credit to consumers through the issuance of bank cards. Such cards, employing magnetic strips, holograms and other identifiers, enable consumers to purchase goods and services while credit is extended at the point of purchase. In doing so, financial institutions generally prescreen card holders establishing a credit limit which the consumer is unable to exceed.

It is well recognized that considerable risk is associated with the issuance of bank cards to customers. Each time a customer makes use of his or her bank card, unsecured credit is extended. The default rate through the use of such cards is quite high in comparison to other types of loans, particularly those in which a security interest is taken by the financial institution. Nevertheless, bank cards have proven to be an exceedingly lucrative vehicle upon which banks and other financial institutions derive income.

There are a number of factors which add to the profitability and thus success of bank cards and which support the issuance of unsecured credit with these cards notwithstanding the heightened risk. Many cards have an annual fee payable by the consumer merely for the privilege of possessing the card and enjoying the flexibility of receiving credit contemporaneous to the purchase of goods and services. In virtually all instances, the financial institution charges an interchange fee, typically about 3% or more of the dollar value of the transaction, most of which goes to the financial institution that issued the bank card, but a percentage of which is attributable to the bank card entity, such as Visa, Mastercard, Diner's Club, American Express and Discover Card. Further, if purchases are not paid by consumers within the first billing cycle subsequent to the purchase, interest rates are imposed by the lending institution or bank at rates far higher than those established for secured loans.

In light of the above, it is well recognized that financial institutions and bank card issuers profit to such an extent that certain incentives have been offered to encourage bank card ownership and usage. For example, many lending institutions waive their annual fees. Other bank cards provide consumers with incentives including cash back or cash credits, airline, hotel and vacation credits and customer perks such as travel related services which are extended to bank card holders particularly in foreign countries. As an example, several lending institutions have established pre-existing relationships with airlines whereby for each dollar attributable to a purchase employing the subject bank card, one airline mile of free travel is credited to the consumer's account. This has proven to be quite successful as many bank card holders put virtually every purchase, from common every day groceries to major appliances and even automobiles on their bank cards in order to expand their airline mile credits. The use of incentives to promote bank card usage and the enhanced profitability to bank card companies and banks and lending institutions is a proven business model which has been successfully employed for many years.

Perhaps it is a gross understatement to suggest that earnings from bank cards are quite impressive. It has been determined that there are approximately two hundred million bank cards in the United States alone, each carrying an average monthly balance of $2,500.00 noting further that card holders average $250.00 per month in new purchases. Many of these cards, particularly those providing for purchasing incentives such as airline mileage require annual fees. Further, interest rates, as noted previously, tend to be quite high because of the unsecured nature of the bank card loans. In addition, vendors who accept bank cards for purchases must pay an interchange fee to the lending institution, a portion of which also is creditable to the bank card issuing organization. Each of these component parts add to the profitability which lending institutions and bank card companies enjoy.

It is thus an object of the present invention to provide a novel incentive program to encourage the use of a specific bank card over all others.

It is yet a further object of the present invention to provide a sweepstakes feature to applicant's bank card to encourage use of this card over its competition.

These and further objects will be more readily apparent when considering the following disclosure and appended claims.

SUMMARY OF THE INVENTION

A method of purchasing goods and services using a bank card that integrates a sweepstakes feature is described. The method comprises providing consumers with a bank card, said bank card being issued to consumers as a means of identifying them and for extending credit to consumers for the purchase of said goods and services. The invention involves establishing a centralized location for identifying consumers that make use of said bank card. A pool of funds is established, the size of which is related to the use of the bank card by consumers. Periodically, a sweepstakes is conducted for distributing prizes to consumers based upon there being holders of said bankcards.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PREFERRED EMBODIMENT

As noted, the present application is a continuation in part of U.S. application Ser. No. 11/089,693 filed on Mar. 24, 2005. The '693 application described a bank card with an integrated lottery feature. Aspects of the parent invention were described as being used in a distributed electronic commerce application that included a computer network system that linked one or more server computers to one or more client computers, as well as server computers to other server computers and client computers to other client computers. The client and server computers included desktop personal computers, workstation computers, mobile computers, portable computing devices, personal digital assistant (PDA) devices, or any other similar type of computing device. The steps of accessing, downloading, and manipulating the data, as well as other aspects of the parent invention were implemented by central processing units (CPU) in the server and client computers executing sequences of instructions stored in memory. The memory was taught to be a random access memory (RAM), read-only memory (ROM), a persistent store, such as a mass storage device, or any combination of these devices. Execution of the sequences of instructions caused the CPU to perform steps according to embodiments of that invention.

Embodiments of the parent invention were directed to entering a bank card user into a lottery or similar game of chance based upon the amount of the user's purchases during a predetermined period of time. Methods of the parent invention involved establishing a pool for the distribution of lottery funds in direct proportion to the use of an applicant's bank card during a specific lottery period, holding the lottery, and notifying lottery participants of the result. Funds for establishing the lottery pool included various elements associated with the credit card transaction, such as the typical interchange and transaction fees, interest on balance carry overs and perhaps annual fees charged by the card issuer to the user. Such proceeds were recorded at a central facility such as centralized computing facility. For purposes of the '693 application as well as the present present invention, the terms "bank card" and "credit card" refer to a debit or credit card that is issued by a bank, credit card company, or any other lender to extend funds to a buyer at the point of purchase. The point of purchase may be a retail store, mail order company, Internet web site, or any similar retail operation.

Figure 1:
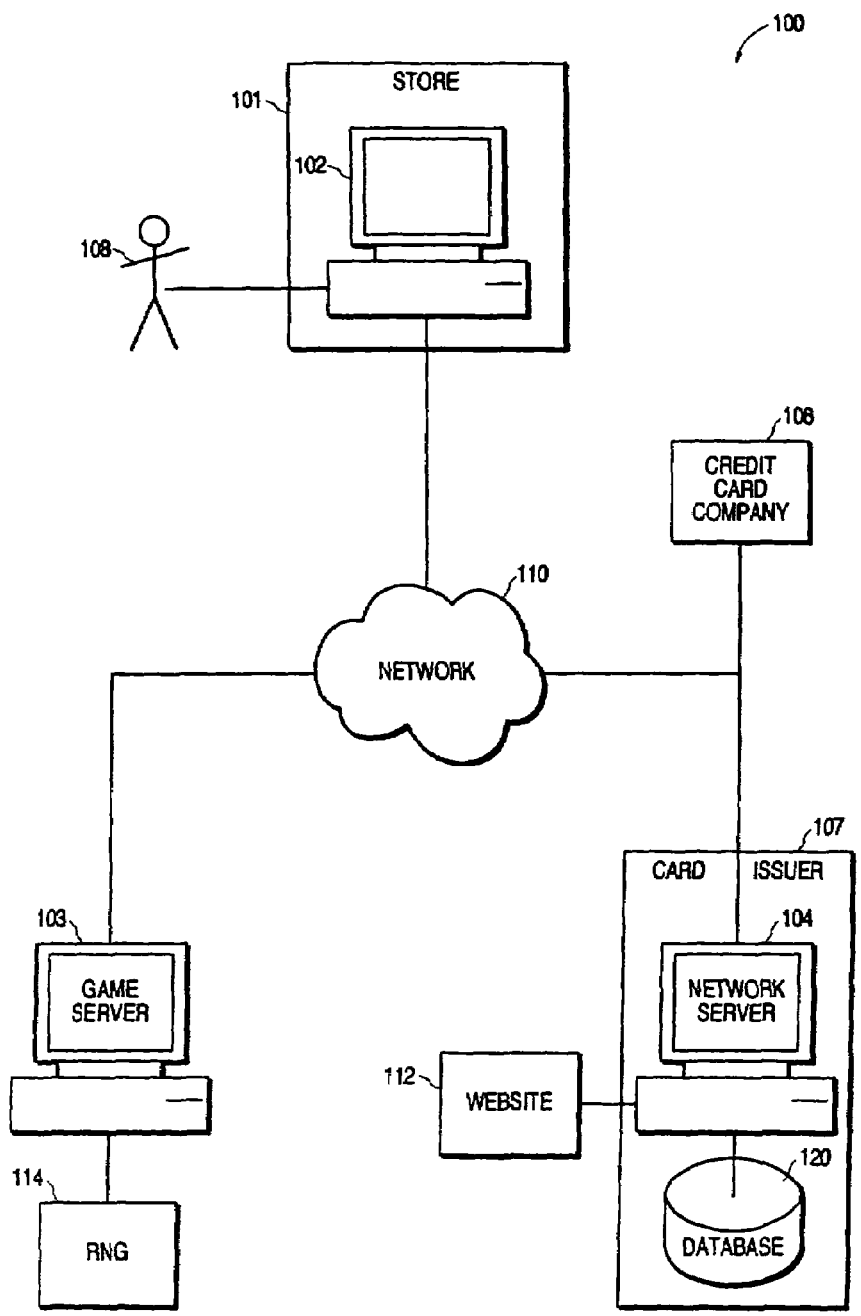
FIG. 1 illustrates a network environment that can be used to implement embodiments of the present invention.

FIG. 1 of the parent and present applications illustrate an overall computing environment 100 used to implement embodiments of that and this application. Program components comprising the finance and gaming aspects of the invention are executed on one or more client 102 and server 104 computers coupled through a network 110. The network 110 is a simple peer-to-peer connection, a private network (e.g., LAN), a wide area network (WAN), or the Internet. For the embodiment in which the network 110 comprised the Internet, the client and server computers communicate using an Internet protocol. In the World Wide Web environment, the network client computer 102 typically accesses the Internet network 110 through an Internet Service Provider (ISP) and execute a web browser program to display data content through web pages. In one embodiment, the web browser program is implemented using Microsoft® Internet Explorer™ browser software, but other web browser programs are also taught to be useful. For the web-based implementation, the server computer 104 executes a web server process that serves web content from a web site 112 maintained on the server computer 104.

For the client-server or Internet embodiments, the system 100 is taught to include other networked servers, such as credit card, bank or financial service computers 106, supplemental servers 103 that provide gaming or lottery services, or similar server computers. It is also noted that the network illustrated in FIG. 1 is intended to include a plurality of server computers coupled to a plurality of client computers.

In a typical bank card purchasing transaction a retail facility representing a remote purchasing location 101 accepts a bank card from a user 108 for purchase of goods or services. To accept the user's bank card, the retailer requests authorization for the purchase from a centralized computer (network server) 104 maintained by the user's bank or bank card issuer 107. Upon completion of the purchase transaction, the transfer of funds through debit of the user's account or extension of credit to the user is confirmed with network server 104, whereupon an electronic record is made of the purchase including its amount in association with the bank card holder whose identity and related information is of record with the card issuer 107.

The card issuer 107 is responsible for fulfilling the transaction between the buyer 108 and the retailer 101. The card issuer may be a bank or credit card company. Alternatively, it may be a third party financial service provider that issues credit to the buyer. In this case, the card issuer 107 may be associated with or utilize the resources of a credit card company, such as Visa® or Mastercard®, in order to provide the issuance of credit to the user.

The parent application taught motivating the card holder to employ a particular bank card in making a purchase at remote purchasing location 101 to the exclusion of other bank cards in the purchaser's possession by providing a chance to compete for one or more prizes in a lottery drawing associated with the use of the card for the purchase. As such, it was a feature of that invention to be able to communicate to the purchaser certain lottery numbers or other identifying indicia to enable the purchaser to track this identifying information and to associate it with a lottery drawing conducted at a later point and time. In one method of associating a purchase with a lottery, at the time of purchase at remote purchasing location 101, the card issuer 107 engaged a random number generator that created a series of lottery numbers virtually simultaneously with the purchase being conducted at remote purchasing location 101. These random numbers associated with a specific bank card holder and specific purchase were recorded in a database 120 maintained by the network server 104 and maintained of record at least until the next lottery is carried out.

The random number generator function utilized for the generation of lottery numbers of the patent application and for choosing sweepstake winners pursuant to the present invention can be a resident process executed by the network server 104, or it can be a process executed by a supplemental server, such as game server 103 maintained by a game administrator and executing a random number generator (RNG) process 114.

The randomly generated lottery numbers or sweepstakes winners could be directly and simultaneously transmitted to client computer 102 maintained at the remote purchasing location 101. As to the parent invention, bank card users would then receive a paper copy of those numbers as a personalized tracking feature confirming entry into the upcoming lottery. This paper record would also display the date of the next scheduled lottery drawing to ensure that these numbers would only pertain to a specific lottery drawing.

Applicant's parent application also taught as an alternative embodiment, the random number generator process providing a bank card holder at remote purchasing location 101 with an instant lottery prize. A similar protocol could be used to identify instant sweepstakes winners.

Alternatively, or as an addition to providing a consumer with a paper copy of lottery numbers attributable to a purchase, the parent application further provided that the card issuer 107 could communicate pertinent lottery-related information to the eligible bank card holders through a website 112. The website could also be used to notify sweepstakes winners or to inform them of the sweepstakes and of their eligibility. Generally, the website would be available to the public as an advertising medium promoting applicant's bank card and related lottery and sweepstakes features. The projected grand prize and secondary prizes, if any, could be displayed on remote website 112. However, in order to track a bank card holder's current status and total purchases during the current lottery or sweepstakes period as well as to track the specific lottery numbers attributed to such purchases, the bank card holder would be called upon to enter the appropriate bank card number and personal identification number (PIN). The actual lottery or sweepstakes drawing results could also be posted on the website as the subject lottery or sweepstakes drawing was held.

Figure 2:
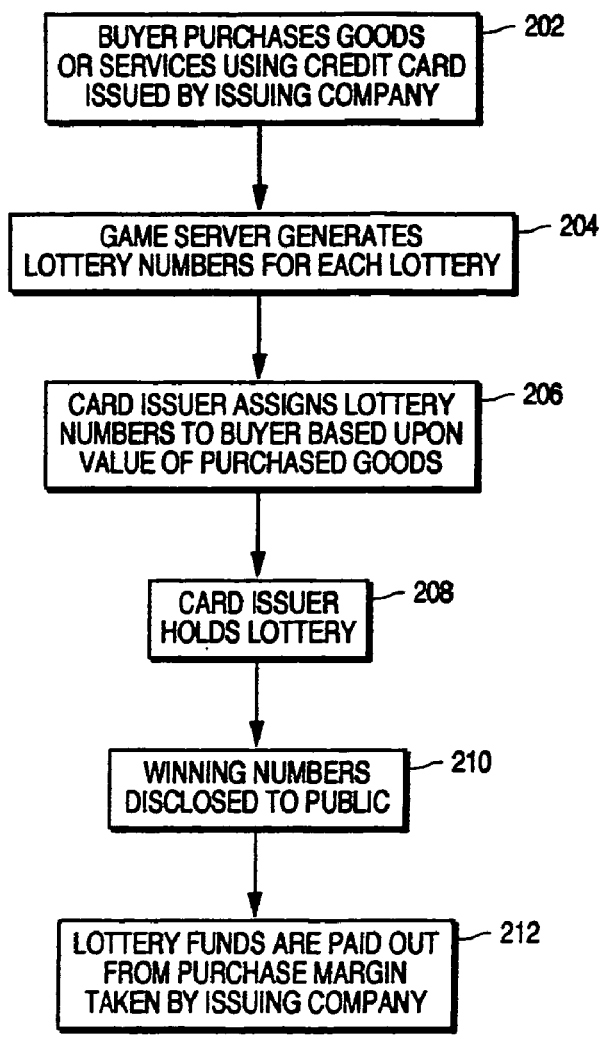
FIG. 2 is a flowchart that illustrates the steps of associating a gaming function with purchases using a bank card, according to a method of the present invention.

FIG. 2 was also disclosed in the parent application as a flowchart that illustrates a method of associating a lottery with a bank card purchase, according to one embodiment of that present invention. In step 202, a buyer that purchased goods or services using a credit card issued by the issuing company made the user eligible for lottery drawings held by the card issuer or other game administrator. A game server function executed by the card issuer or separate game administrator generated lottery numbers for each lottery using a random number generator process, step 204. The card issuer assigned lottery numbers to the buyer based upon the value of purchased goods, step 206. The value of the purchase was related to the purchase value, and therefore the degree of card usage. The more the buyer used the card, the greater were his or her chances of winning a prize. In the present invention, no purchase would be necessary to qualify for entry into the sweepstakes drawing. The number function would only be replaced by a random selection of sweepstakes winners based upon numbers of bank cards held by owners in good standing. The assignment of numbers to purchase value or to card members are defined by the card issuer or game administrator, and depended on the type and size of the lottery or sweepstakes. For example, the card issuer could have issued a single lottery number for each dollar spent during a credit card transaction, or a certain number of lottery numbers could have been assigned for every x dollars spent during a certain period of time or single or multiple numbers assigned to bank card holders.

As the parent application taught, each lottery is held open for a predetermined period of time during which a buyer's use of the card generates a certain batch of lottery numbers. At the end of the lottery period, the card issuer holds the lottery, step 208. The winning numbers are then disclosed to the public, step 210, such as through website 112. The prizes are then disbursed to the winning card holders. The prizes are paid out from the lottery fund, step 212. The lottery fund can be established from the bank interchange fees, periodic interest fees, annual fees, or any other fees charged to the user of the card from the card issuer 107 or credit card company 106. The same protocol could be used to identify and notify bank card holders during a period in which a sweepstakes was being held.

The limitation in carrying out the method of the parent application was that it was necessary that applicant be associated with an entity capable of offering a lotto or gaming feature to the general public. Such entities include American Indian tribes who are authorized to engage in gaming pursuant to the federal Indian Gaming Regulation Act (IGRA) 25 U.S.C. Section 2701-2721. The policy of the IGRA is to provide for tribal economic development, self-sufficiency, and strong tribal government. In doing so, 25 U.S.C. Section 2701(5) provides tribes with "the exclusive right to regulate gaming activity on Indian lands if the gaming activity is not specifically prohibited by federal law and is conducted within a state which does not, as a matter of criminal law and public policy, prohibit such gaming activity." The issuance of bank cards in conjunction with the IGRA is contemplated as one embodiment for carrying out the method of the parent application.

It was contemplated by applicant that one or more Indian tribes would act as issuers of the appropriate bank card with lottery feature either alone or in conjunction with an established bank card provider 106 such as Visa® or Mastercard®. If a relationship was established with a bank card provider, that bank card provider would receive its typical transaction fee. Nevertheless, the interchange fees attributable to each purchase as well as ongoing interest charges for accumulated bank card balances would be more than enough to establish significant funding for lottery prizes while still enabling the Indian tribe to realize significant earnings.

Although the invention as described in applicant's parent application is commercially important as it will undoubtedly stimulate bank card usage by consumers, the practice of that invention does have certain inherent limitations. For example, providing a lottery feature with a bank card will require participation by an entity that is legally in a position to offer gaming to bank card holders. Although in certain Indian reservations and certain states and foreign entities can legally do so, the vast majority of United States jurisdictions prohibit gaming and require that lotteries be made the exclusive privilege of state government operations. As such, it is realized that other stimulants to encourage bank card ownership without offering a lottery feature would be desirable.

The present invention, employing a good deal of the computer hardware and software as described above could promote bank card ownership as long as prizes which are provided to consumers are awarded in the form of a sweepstakes where qualification for a prize or award is not dependent upon bank card usage. In other words, the mere ownership of the appropriate bank card would be enough to qualify a consumer as a potential recipient of a periodically awarded prize.

As noted, in implementing the present invention, much of the same hardware and software described above can be employed. For example, a random number generator process providing a bank card holder at remote purchasing location 101 with an instant prize can be implemented. However, again, the nature of the prize and the consumer to whom it is being awarded will be independent of the extent of bank card usage. Such a prize could be awarded directly at a retailer's facility by informing the consumer that the specific purchase will result in no debt imposed upon the consumer as reflected in the consumer's next bank card billing statement. Alternatively, the consumer could leave the retail establishment believing that a debt has been incurred but the prize in the form of a debt free purchase could appear for the first time on the consumer's bank card statement.

As stated previously, implementation of the present invention in awarding a sweepstakes prize does not require bank card usage at all. As such, a consumer could receive notification via any of the above-described media including the Internet or by regular mail or telephone that the consumer, through his or her bank card has been selected randomly as a prize winner and be awarded as a cash award or credit for future purchases. In that no purchasing is required for the consumer to qualify as a potential sweepstakes winner and the odds of winning a sweepstakes is not dependent upon bank card usage, the present invention has none of the attributes of a lottery or, gaming, generally.

As in the invention described in applicant's parent application, the prizes could be awarded periodically and vary in size dependent upon the size of a pool of funds established by the bank card issuing company or financial institution. Also, grand prize and secondary prizes could be established, all promoting a consumer's willingness to possess, as a record holder, the bank card made the subject of the present invention. As such, although the present invention does not necessarily promote bank card usage of the present card over its competitors, the present invention does encourage consumers to willingly become holders of applicant's bank card and, in doing so, are likely to use this card on a regular basis.

In the foregoing, a system has been described for integrating lottery or similar gaming features with use of a credit or bank card. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a method of purchasing goods or services with use of a bank card, said bank card being issued to consumers as a means of identifying the consumers and for extending credit to the consumers for the purchase of said goods or services, the improvement comprising establishing a database of said consumers and choosing at least one consumer from said database as a recipient of a prize whereby qualification for said prize is not dependent upon bank card usage.

2. The method of claim 1 wherein said prize comprises a cash prize from a pool of funds.

3. The method of claim 2 wherein the size of said pool of funds is related to the use of said bank card by said consumers over a fixed period of time.

4. The method of claim 3 wherein prizes are distributed over said fixed period of time.

5. The method of claim 1 wherein said prize is a cash prize.

6. The method of claim 1 wherein said prize comprises a credit given for the purchase of said goods or services.

7. The method of claim 6 wherein said credit is awarded to a consumer at the time of purchase of said goods or services.

8. The method of claim 6 wherein said consumer is notified of said credit for said goods or services in a billing sent to said consumer after purchase of said goods or services.

* * * * *